(12) United States Patent
Aldridge et al.

(10) Patent No.: US 7,039,276 B2
(45) Date of Patent: May 2, 2006

(54) OPTICALLY CONNECTING EMBEDDED OPTICAL FIBERS IN COMPOSITE PANELS

(75) Inventors: Nigel Bruce Aldridge, Gloucestershire (GB); Geoffrey Martland Proudley, Gloucestershire (GB); Peter David Foote, Monmouth (GB); Ian James Read, Bristol (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 10/088,227

(22) PCT Filed: Jan. 5, 2001

(86) PCT No.: PCT/GB01/00038

§ 371 (c)(1),
(2), (4) Date: Mar. 19, 2002

(87) PCT Pub. No.: WO01/51974

PCT Pub. Date: Jul. 19, 2001

(65) Prior Publication Data

US 2002/0136498 A1    Sep. 26, 2002

(30) Foreign Application Priority Data

Jan. 11, 2000    (GB)    ................................ 0000415.0

(51) Int. Cl.
    *G02B 6/26*    (2006.01)
(52) U.S. Cl. .......................................... 385/39; 385/50
(58) Field of Classification Search ................ 385/39, 385/31, 50, 52, 55, 70
    See application file for complete search history.

(56) References Cited

U.S. PATENT DOCUMENTS

| 4,537,469 A | 8/1985 | Kircher |
| 4,753,497 A | 6/1988 | Fujii et al. ................ 350/96.15 |

(Continued)

FOREIGN PATENT DOCUMENTS

DE    19826648    12/1999

(Continued)

OTHER PUBLICATIONS

"Low-loss single-mode optical couplers" G. Georgiou et al—IEE Proceedeings, vol. 132, Pt. J., No. 5, Oct. 1985, pp. 297-302.

(Continued)

*Primary Examiner*—Sung Pak
(74) *Attorney, Agent, or Firm*—Crowell & Moring LLP

(57) ABSTRACT

A method of and an apparatus for coupling a first optical transmission means (10,42), such as an optical fibre, embedded within an aircraft composite (12,40) to a second optical transmission means (14), such as an optical fibre, external to the composite (12,40) is described. The method comprises locating the position of the first optical means (10,42) embedded within the composite (12,40) using X-ray scanning for example; forming a passageway (20,62) by laser machining or drilling within the composite (12,40) to the first optical transmission means (10,42); and establishing an optical connection between the first and second optical transmission means (10,42,14) at the intersection of the passageway (20,62) and the first optical transmission means (10,42).

48 Claims, 6 Drawing Sheets

U.S. PATENT DOCUMENTS

| | | | |
|---|---|---|---|
| 4,779,945 A | 10/1988 | Hill et al. | 350/96.15 |
| 5,125,054 A | 6/1992 | Ackley et al. | 385/49 |
| 5,299,273 A | 3/1994 | Evans | 385/12 |
| 5,408,567 A | 4/1995 | Hamilton | |
| 5,408,568 A | 4/1995 | Hamilton | 385/132 |
| 5,473,721 A | 12/1995 | Myers et al. | 385/129 |
| 5,499,732 A | 3/1996 | Nishimoto | |
| 5,500,913 A * | 3/1996 | Allen et al. | 385/48 |
| 5,555,330 A | 9/1996 | Pan et al. | 385/39 |
| 5,809,197 A | 9/1998 | Delbare et al. | 385/139 |
| 6,233,376 B1 * | 5/2001 | Updegrove | 385/14 |

FOREIGN PATENT DOCUMENTS

| | | |
|---|---|---|
| EP | 0272027 | 6/1988 |
| EP | 0 497 011 A1 | 1/1991 |
| EP | 0 822 430 A2 | 7/1997 |
| EP | 0 908 747 A1 | 4/1999 |
| GB | 2 193 816 A | 7/1986 |
| GB | 2 266 160 A | 4/1993 |
| GB | 2 273 207 A | 12/1993 |
| GB | 2 322 479 A | 10/1997 |
| GB | 2 340 959 A | 8/1999 |
| GP | 2 168 165 A | 12/1984 |
| JP | 59-101216 | 6/1984 |
| JP | 10126018 | 5/1998 |
| WO | WO98/18301 | 4/1998 |
| WO | WO98/25862 | 6/1998 |

OTHER PUBLICATIONS

"Filter-Embedded Design and Its Applications to Passive Components" H. Yanagawa et al, 1989 IEEE, pp. 1646-1653.

"Optical fiber sensors for spacecraft applications" E.J. Friebele et al, 1999 IOP Publishing Ltd., pp. 813-838.

International Search Report.

British Search Report.

European Search Report.

* cited by examiner

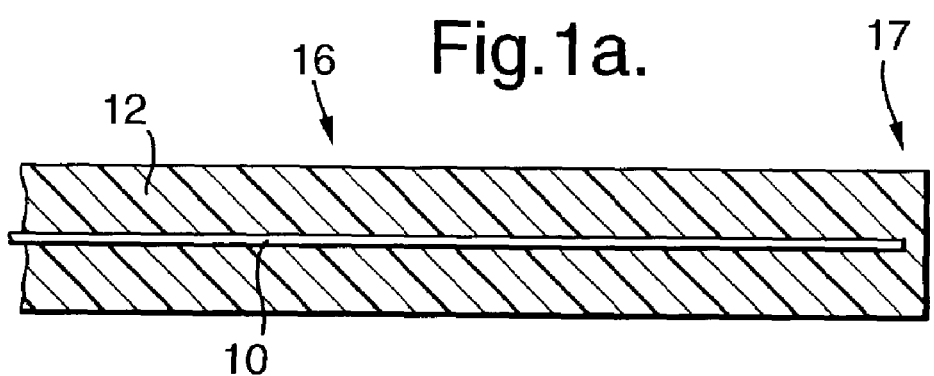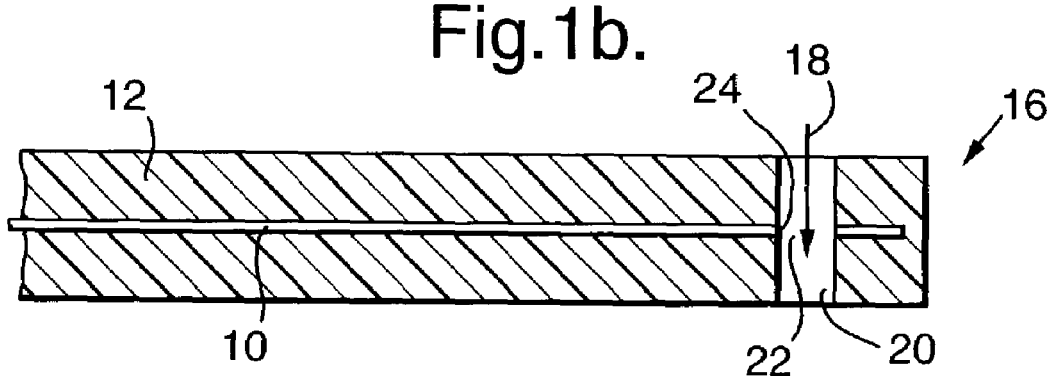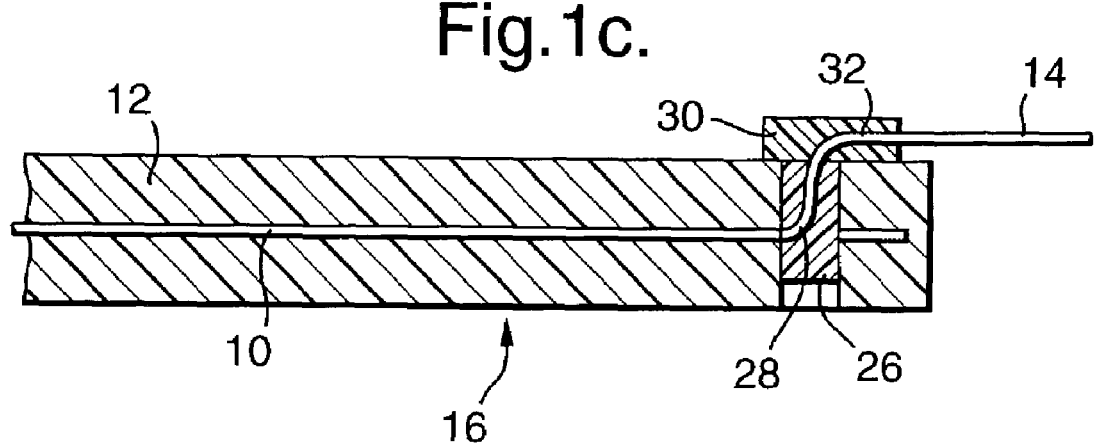

OPTICALLY CONNECTING EMBEDDED OPTICAL FIBERS IN COMPOSITE PANELS

BACKGROUND OF THE INVENTION

The present invention concerns improvements relating to interfacing optical transmission structures and more particularly, though not exclusively, to a method and an apparatus for coupling a first optical transmission means, such as an optical fiber, embedded within a composite such as an aircraft panel to a second optical transmission means, such as an optical fiber, external to the composite. The present invention also concerns such a method or apparatus which can provide a coupling to a minimal number of steps thereby simplifying the coupling procedure.

The phrase 'embedded within a composite' in the context of the present invention is intended to mean that, at a possible point of connection, the article is completely surrounded by the composite and is located beneath the exterior surfaces of the composite after manufacture. Such an embedded article is not exposed to the exterior surface and can only be accessed by entering the interior of the composite.

The term 'composite' as used herein is to be construed broadly, in that it is directed to any support structure for carrying a light transmission means. Typical composites are aircraft panels, and other supportive structures made from plastics materials, carbon fiber, glass or metal for example and include multi-layer structures.

The use of optical fibers and advanced composites is becoming more accepted in the aircraft industry over the previous systems of lightweight metals and electrical wiring. There are many advantages to the use of optical fibers, such as reduced weight, elimination of electromagnetic problems, such as noise pick up and incidental radiation of signals, lower raw material costs, and elimination of potential dangerous conductive paths. Whilst these advantages are clearly desirable, the use of optical systems in aircraft has its own specific characteristics, different from those associated with conventional systems, which have to date slowed acceptance of this new technology.

Fiber optics embedded in composite structures can provide elegant distributed and embedded sensing functions (e.g., of strain, temperature) as well as the potential for embedded communications links. Despite the proven functionality of such embedded optical fiber structures, problems remain as to the best way of interfacing (i.e., launching and extracting light) to/from the embedded optical fibers. One way, described in U.S. Pat. No. 5,299,273, involves attaching a relatively large optical connector to a composite laminate part having an optical fiber embedded therein. The optical connector is attached by trimming the structure across the path of the optical fiber thereby exposing an end of the fiber that lies flush with the surface of the structure. Then the optical fiber is polished and the connector is fitted using micro-positioning techniques to correctly align the connector and optical fiber.

Other current solutions include allowing delicate embedded fibers to emerge from the structure surface or edge (so called 'flying leads'), or embedding fibers connectors in a surface of the composite at the ends or sides of embedded optical fibers for subsequent connection to external optical devices or other optical fibers. Examples of the latter type of coupling are shown in U.S. Pat. No. 5,809,197 and in the paper by S. Meller, J. Greene, C. Kozikowski, K. Murphy, R. Claus, "Polymer and Metal-Matrix Composite-Embedded Optical Fibres for Avionics Communications Links", SPIE Proceedings Vol. 3042, pp. 383–388, 1997.

The provision of 'flying leads' is problematical in that these are potential single points of failure during use of the composite. As well as being prone to damage, the fibers muse be managed during composite manufacture (lay-up) which will increase manufacturing complexity, time and cost. Likewise, the provision of conventional embedded connectors at the composite surface can also complicate the manufacturing process particularly since these embedded connectors tend to be rather bulky and require careful protection. Additionally, resin accretion can occur round these connectors (and also in the case of flying leads) which can lead to embrittlement and contamination effects.

Generally, all of the above methods suffer from the problems of potential damage to the optical fibers emerging out of the composite and to be embedded connectors present at the surface of the composite when the composite needs to be 'finished' in its manufacturing process. These problems have hindered the universal acceptance of embedded optical fibers systems within the aircraft industry.

It is desired to overcome or at least substantially reduce the above described problems.

SUMMARY OF THE INVENTION

The present invention resides in the appreciation that the embedded optical fibers or the optical connectors need not be exposed at a surface of the composite until after manufacturing processes, such as trimming and routing, on the composite have been completed. Once these manufacturing processes are complete, the embedded optical fiber or optical connector can be located and a passageway to it formed in the composite. In this way, the above described problems can be substantially alleviated.

More specifically, according to one aspect of the present invention there is provided a method of coupling a first optical transmission means embedded within a composite to a second optical transmission means external to the composite, the method comprising: providing an optical processing means for optically processing light to or from the first optical transmission means, said optical processing means being disposed on a micro substrate embedded within the composite; securing the first optical transmission means to the optical processing means using the micro substrate; locating the position of the first optical means embedded within the composite; forming a passageway within the composite to the first optical transmission means; and establishing an optical connection between the first and second optical transmission means at the intersection of the passageway and the first optical transmission means.

The present invention allows the optical transmission means to be hidden (inaccessible) within the composite, until such time as required, namely post manufacture, of the composite. Then access to the transmission means can be recovered as required. This concept of complete embedment and recovery, post-manufacture also advantageously allows redundancy to be built into the composite. Spare embedded optical transmission means and/or interface optics could be embedded within the composite but remain hidden in the structure until required, for example if an existing optical transmission means and/or interface becomes damaged. These links would also be hidden at the time of manufacture of the composite and require no external management of delicate trailing leads for example. When a new optical communication channel or sensing function is required, the location of a selected transmission means can be detected and an appropriate passageway to the transmission means formed for access thereto. Accordingly, additional links and/or sensing functions can be provided without the need for additional optical transmission means external to the composite.

The present invention also provides benefits in terms of reduced manufacturing complexity, time and cost. The total number of operations required to establish a connection may also be reduced as compared to the conventional system. Furthermore, it is considered that the present invention will speed the implementation of embedded optical fiber systems in the aerospace industry.

The method may further comprise providing a high-quality optical interface surface at the intersection of the passageway and the first optical transmission means. This is preferably provided at the time when the first optical transmission means is embedded within the composite. The term 'high-quality optical interface surface' as used in the present invention is intended to denote a surface which can be coupled to another optical surface and provide an acceptable optical interface (having an acceptably low level of signal loss) without the need for quality enhancing measures such as polishing of the surface. By providing such a high-quality surface, the interconnection to the first optical transmission means is made simpler in that there is no need to provide extra processing steps, such as polishing, to create an acceptable quality optical interface for light transmission.

The step of forming a passageway may comprise drilling or machining through the composite from an exterior surface thereof to the first optical transmission means and severing the first optical transmission means. This is one of the simplest ways of creating a passageway in a composite using readily available tools. In this case, the step of providing an optical interface surface preferably comprises polishing a severed portion of the first optical transmission means. The polishing step is necessary to transform the severed portion of the first optical transmission means into a high-quality optical interface.

The step of forming a passageway may comprise: drilling or machining through the composite to the first optical transmission means; providing the passageway with a protective plug for closing the passageway; and removing the protective plug prior to the step of forming an optical connection. In this way, access to the first optical transmission means advantageously can be established prior to completion of any manufacturing processes on the composite and the passageway and first optical transmission means can be protected by the provision of the plug.

Preferably the step of forming a passageway comprises irradiating an exterior surface of the composite using a laser (appropriate for machining the particular composite) to access the first optical transmission means. In addition, the laser irradiation step preferably comprises using an Excimer laser. Laser irradiation advantageously provides a highly accurate way of forming a passageway in the composite to the first optical transmission means. Furthermore, using Excimer laser means that the passageway can be formed with a reduced composite heating effect.

The step of forming a passageway may comprise using a depth marker to indicate when the passageway has been formed to the correct depth. This is particularly useful in laser machining where the light used for ablation can also be monitored for reflection to determine when a reflective marker representing a correct depth has been reached.

When using a laser, the method may further comprise preventing light used in the laser irradiation step from being optically coupled with the first optical transmission means. The purpose of such a step is to prevent any damage occurring to the first optical transmission means which may be caused by the wavelength of the laser irradiation.

In this regard, the preventing step preferably comprises differentiating between the wavelengths of the light used in the laser machining step and the light used in the first optical transmission means, and preventing transmission of light used in the laser machining step to the first optical transmission means. This provides a way of preventing optical coupling between the laser light and the first optical transmission means which advantageously uses a minimal number of components. The two wavelengths can be differentiated e.g., by a wavelength selective mirror or beam splitter. Once the two wavelengths or light can be differentiated, one simple preferred way of preventing further optical coupling is for the preventing step to comprise allowing the light used in the laser machining step to be transmitted to at least one light beam absorbing means provided within the composite.

In order to determine the location of the first optical transmission means, the locating step may comprise using an embedded detectable position marker to indicate the location of the first optical transmission means within the composite. This is useful when the material of the composite and the first optical transmission means are not easily differentiated by the locating step.

In an embodiment of the present invention, the depth marker comprises the position marker and hence the number of additional components is advantageously reduced. Also, the position marker or the depth marker may comprise a sacrificial coating and the laser irradiation step may further comprise removing the coating after formation of the passageway to access the first optical transmission means. In this way, the precise depth of the passageway can be controlled with high accuracy.

The step of locating the position of the first optical transmission means or the step of forming a passageway may comprise locating the position of the position marker or the depth marker within the composite using an imaging technique. In this way, a map of the location of the first transmission means can be determined for the subsequent passageway formation. Preferably, the imaging technique comprises an X-ray imaging process. This non-invasive method is highly discriminatory and can distinguish between optical fibers and carbon fiber or plastics components, for example.

Regarding the interconnection interface, the step of establishing an optical connection may comprise providing a thermal expanded core optical fiber at the optical interface surface. This reduces the alignment constraints at the point of interconnection thereby easing the interconnection process.

The method may further comprise aligning an interface means within the passageway to be in optical communication with first optical transmission means at the interface surface, and arranging for the interface means to be accessible to the second optical transmission means. The interface means enables the first and second optical transmission means to be optically interconnected and movement of the interface means provides readily adjustable interconnection alignment between the first transmission means and the second transmission means.

Preferably, the aligning step comprises using an alignment structure embedded within the composite to align the interface means with the first optical transmission means. This advantageously speeds up the interconnection process as an accurate interconnection can be without undue delay which may otherwise be caused by alignment procedures.

The method may further comprise forming the alignment structure embedded within the composite using an X-ray lithographic technique. This technique simplifies three-dimensional structure formation in that no special tools and machining skills are required to create the structures. Rather, they can be created under computer control with exceptional repeatability.

The method may further comprise optically processing light to or from the first optical transmission means by an optical processing means embedded within the composite and optically connected to the first optical transmission means. Whilst there is always some loss with an optical coupling, the optical processing can enhance a signal at the optical interface to improve the efficiency of the optical coupling. In addition, the light from the first transmission means can be manipulated to optimize its extraction from the composite. For example, the step of optically processing light may comprise steering a light beam. More specifically, the steering step may comprise using a beam splitter or a micro-turning mirror. Also the step of optically processing light may comprise collimating a light beam and the light beam collimating step may comprise using a graded index lens or a graded index fiber. All of these different ways of manipulating the light beam can advantageously configure the interfacing process to optimize transmission characteristics regardless of the desired location of input/output to/from the composite.

The method may further comprise providing the optical processing means on a micro-substrate and securing the first optical transmission means to the optical processing means using the micro-substrate. This advantageously provides a secure, strain-relieving connection between the optical processing means the first optical transmission means. Furthermore, the orientation of the optical processing means can be controlled as the micro-substrate may be more readily alignable than the optical processing means itself.

The method may further comprise providing the alignment structure on the micro-substrate. In this way, a single micro-structure need only be prepared to implement several functions without the need for other specialist structures. This advantageously reduces costs.

The first optical transmission means may comprise an elongate structure and the step of establishing an optical connection may be effected to a side of the elongate structure. In this case, the step of providing an optical interface surface preferably comprises providing a first evanescent coupling means optically connected to the first optical transmission means. This is an efficient way of dividing out some of the optical signal from the first optical transmission means to the second optical transmission means.

Preferably, the step of establishing an optical connection comprises providing a second evanescent coupling means optically connected to the second optical transmission means and aligning the second evanescent coupling means with the first evanescent coupling means. Providing mutually co-operating evanescent couplings maximizes the efficiency of the coupling process.

The first and second optical transmission means preferably comprise optical fibers because these are some of the most cost-effective and efficient optical transportation systems currently available.

Micro-optical components or an assembly of components are preferably completely embedded along with the fiber at the time of manufacture. The micro-optics package could be based on a number of technologies. GRIN (Graded Index) lenses or fibers could be interfaced (e.g., spliced) to the embedded system fiber to provide beam collimation (for eased alignment to the other half of the interface).

It is necessary to 'find' the buried micro-optics with the machining laser (or alternative process). However, the target site could be readily identified prior to machining by embedded structures (e.g., metallic coatings) that would be visible on X-ray of the composite.

It is possible to use TEC optical fibers, possibly spliced to the embedded optical fiber or formed at the end of the system fiber to expand the core of the embedded fiber to relax alignment constraints.

The present invention enables a composite to be formed with embedded optical fibers and micro-optical components. The composite can be processed through any number of manufacturing steps until a finished composite is created. Then by X-ray imaging of the composite, the location of the optical fibers and/or any micro-optical components can be determined and markings can be provided for subsequent use on the composite. These markings represent drilling points for accessing the embedded optical fibers and/or micro-optical components.

According to another aspect of the present invention there is provided an optical coupling for connecting a first optical transmission means embedded within a composite to a second optical transmission means external to the composite, the coupling comprising: an optical processing means optically connected to the first optical transmission means for processing light to or from the first optical transmission means, said optical means being provided on a micro substrate and secured to the first optical transmission means, wherein the micro substrate and optical processing means are embedded within the composite means for locating the position of the first optical transmission means embedded within the composite; a passageway formed within the composite to the embedded first optical transmission means; and an optical connection established between the first and second optical transmission means at the intersection of the passageway and the first optical transmission means.

Other objects, advantages and novel features of the present invention will become apparent from the following detailed description of the invention when considered in conjunction with the accompanying drawings.

BRIEF DESCRIPTION OF THE DRAWINGS

FIGS. 1a, 1b and 1c are schematic partial sectional views of an aircraft composite incorporating an optical fiber showing different stages of a method of interfacing to the embedded optical fiber according to a first embodiment of the present invention;

DETAILED DESCRIPTION OF THE INVENTION

Figure 2A:
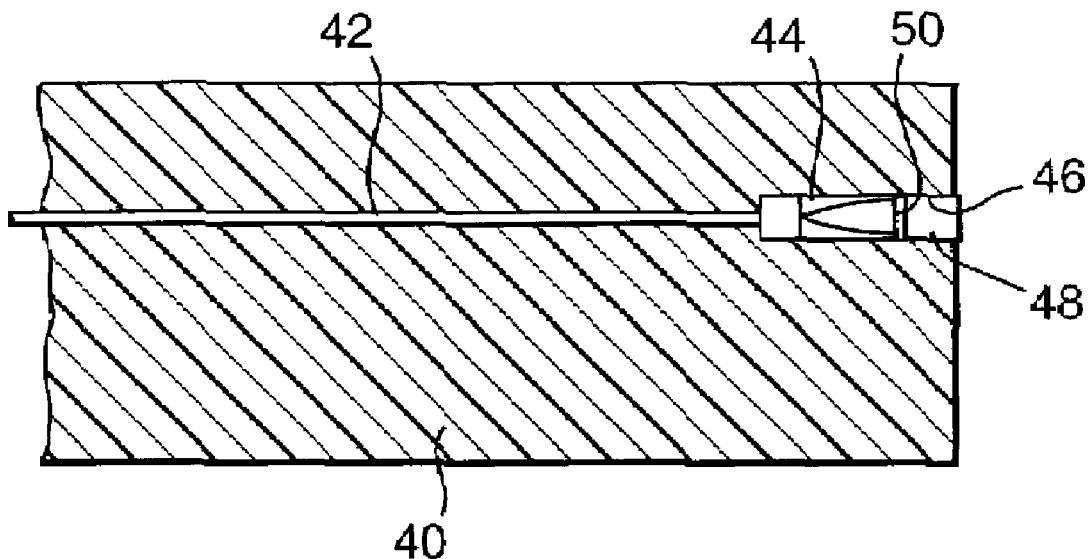
FIGS. 2a and 2b are schematic partial sectional views of aircraft composites each incorporating an optical fiber and an embedded optical port according to respective second and third embodiments of the present invention.

Referring to FIGS. 1a, 1b and 1c, a method of coupling an optical fiber 10 embedded within a carbon fiber aircraft composite 12 to another optical fiber 14 provided externally of the composite 12 according to a first embodiment of the present invention, is now described. The optical fiber 10 is embedded at the time of manufacture of the composite 12 and is effectively hidden from the exterior surfaces 16 of the composite 12 at all possible points of connection as the optical fiber 10 does not extend to a connection surface 16 of the composite 12. In this way, the connection surfaces 16 of the composite 12 can be finished in the manufacturing process without damaging the optical fiber 10.

FIG. 1a shows one end 17 of the aircraft composite 12, having the optical fiber 10 embedded therein, which has been through the finishing processes of manufacturing. Although not shown, the other end of the composite 12 may be similar to that shown in FIG. 1a. In order to form an optical connection to the embedded optical fiber 10, the composite 12 is scanned by X-rays and the results thereof establish the exact location of the optical fiber 10 within the composite 12. It is not necessary to provide any special detection feature of structure within the composite, as the location of the optical fiber can be readily determined. If image enhancement of the embedded structure is required, selective fiber coating (prior to embedment) could be used. The results are used to determine a drilling point 18 for creating access to the buried optical fiber 10 from the exterior of the composite 12.

Access to the buried optical fiber is established in the composite 12 by drilling a hole (passageway) 20 from the determined drilling point 18 through the composite 12 as shown in FIG. 1b. Hole drilling is an accepted production practice and is routinely performed in composite manufacturing. The thus formed passageway 20 intersects the optical fiber 10 and severs it. In order to reinstate an optical finish on the face of the optical fiber 10, namely to form a high-quality optical interface at the severed portion 22 of the optical fiber 10, the severed portion 22 is then polished using a standard polishing process which requires no further explanation herein. However, it is to be appreciated that the polishing process is carried out from within the passageway 20.

A plug connection is then made to the polished end 24 of the severed optical fiber 12 as shown in FIG. 1c. More particularly, a connector plug 26 having an internal optical transmission path 28 is inserted in the passageway 20 and positioned so as to optically align one end of the transmission path 28 with the polished severed end 24 of the optical fiber 10. The connector plug 26 functions to introduce/extract light to/from the embedded optical fiber 10 via the internal optical transmission path 28. Any alignment technique can be used, but in the present embodiment, alignment is built into the connector plug 26 by use of a three-axes translation micropositioning mechanism (now shown) which moves the internal optical transmission path 28 to maximize the coupling before fixing the relative position of the path and the plug 26 in the passageway and hence the optical alignment.

An interface connector 30 is optically coupled to the other end of the internal optical transmission path 28 of the connector plug 26. In its connected state as shown in FIG. 1c, an internal optical path 32 within the interface connector 30 leads from the connector plug 26 to the external optical fiber 14 which is attached to the interface connector 30. In this way, an optical connection between the embedded optical fiber 10 and the external optical fiber 14 can be established.

Whilst the connection between the embedded optical fiber 10 and the external optical fiber 14 has been shown at one end 17 of the composite 12, the above described connection procedure could be carried out at both ends of the composite 12. This procedure would connect external optical fibers 14 to either ends of the embedded optical fiber 10 which has no portion emerging from any exterior surface 16 of the composite 12. In this way, an optical fiber 10 completely encased within a composite 12 can be used for the transmission of optical signals or the sensing of environmental conditions to which the composite is exposed.

In an alternative embodiment (not shown) to the above described first embodiment, alignment constraints can be eased by using an expanded core fiber, such as a TEC (Thermally Expanded Core) optical fiber, at the interface site where the embedded optical fiber 10 has been severed. More particularly, the TEC optical fiber is spliced onto the optical fiber 10 and embedded within the composite. When the composite is scanned, the X-ray results identify the TEC optical fiber portion and the location of the drilling point 18 is set to create a passageway which will intersect this portion.

Referring to FIG. 2a, a second embodiment of the present invention is now described. As there are many similarities between this embodiment and the first embodiment, the following description will be directed to the differences between these embodiments to avoid unnecessary repetition.

A composite panel 40 including an embedded optical fiber 42 is used. The optical fiber 42 has a micro-optical component 44 provided at one end thereof which is also completely embedded within the composite panel 40 at the time of its manufacture. The micro-optical component 44 comprises e.g., a GRIN (Graded Index) lens which is bonded fused to the embedded optical fiber 42 to provide beam collimation for eased alignment with another half of the interface (plug connector 26 and interface connector 30 as in the first embodiment). Alternatively, the GRIN lenses can be replaced by an appropriate length of GRIN (Graded Index) fiber.

Prior to finishing of the manufacturing processes on the composite panel, the location of the micro-optical component 44 is determined by use of an imaging technique such as X-ray scanning and a passageway 46 to the micro-optical component 44 is formed, by drilling for example. The passageway 46 in this embodiment is formed in-line with the micro-optical component 44 via an end face of the composite 40. The thus formed passageway 46 is then temporarily sealed with a protective plug 48 to protect the embedded micro-optical component 44 from the subsequent composite finishing processes. Once the finishing processes have been completed, the plug 48 can be removed to provide access to the buried micro-optical component 44 and hence the embedded optical fiber 42. Removal of the plug 48 thereby provides an interface port to the embedded optical fiber 42 via an embedded high-quality optical surface 50 provided by the micro-optical component 44. Links to the outside world are then installed using a connector plug and interface connector (not shown) as in the first embodiment. The formation of ports could be performed after composite finishing, where the plugs merely provide protection of the interface until some later time when the connection is made.

If required, the high-quality optical surface 50 can be covered with a protective coating (not shown) which is removable by chemical etching for example, just prior to forming the optical connection. In addition, whilst GRIN lenses have been used in the above described embodiment, it is also possible to replace these with GRIN fiber that perform essentially the same operation.

Figure 2B:
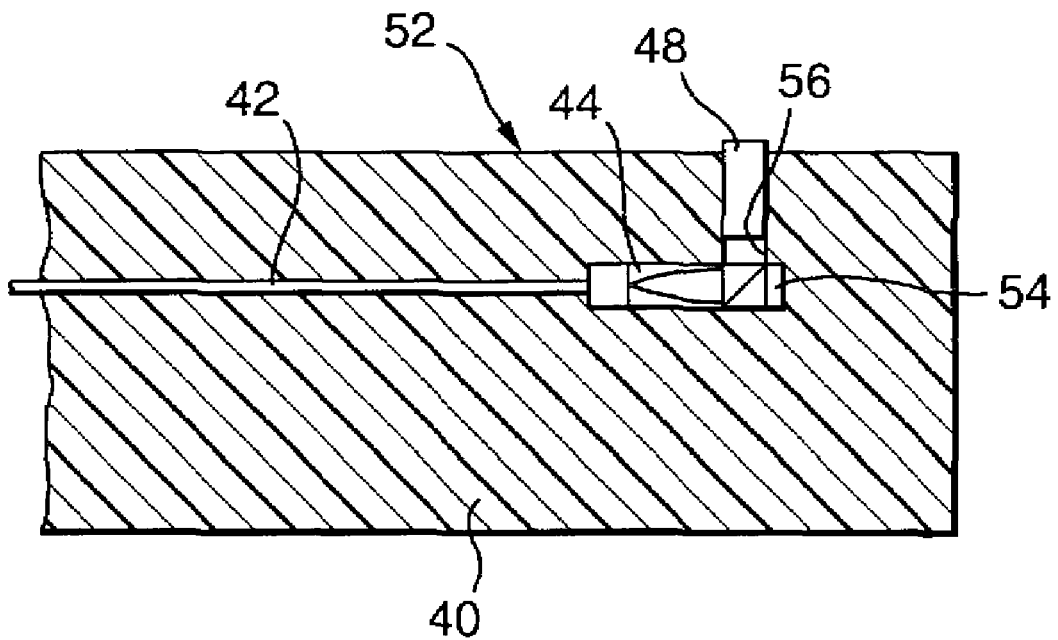

A third embodiment of the present invention is now described with reference to FIG. 2b. The third embodiment is very similar to the second embodiment and, accordingly, to avoid unnecessary repetition, only the differences will be discussed hereinafter.

In the third embodiment, it is desired to connect to the embedded optical fiber 42 from an upper side face 52 of the composite 40. Accordingly, the micro-optical component 44 is provided with a micro-turning mirror 54 for controllably steering the direction of light emitted from the embedded optical fiber 42 via the micro-optical component 44. In the present embodiment, the light is reflected and turned through 90° using the micro-turning mirror 54 having a 45° mirror angle. As the resultant light beam is steered towards the upper side surface 52 of the composite 40, a passageway 56 is provided from the upper side surface 52 of the composite 40 to the micro-turning mirror 54. The passageway 56 is then sealed with the protective plug 48 until the manufacturing processes being carried out on the composite 40 have been completed as in the previously described second embodiment.

An alternative light beam processing element to the micro-turning mirror 54, which could be used if required to provide beam steering, is a beam splitter (not shown). Other micro-optical structures that could be embedded include gratings, wave-guides, evanescent couplers, wave-plates, holograms and optical filters. These structures could be involved in system interrogation as well as providing an optical interface.

Figure 3A:
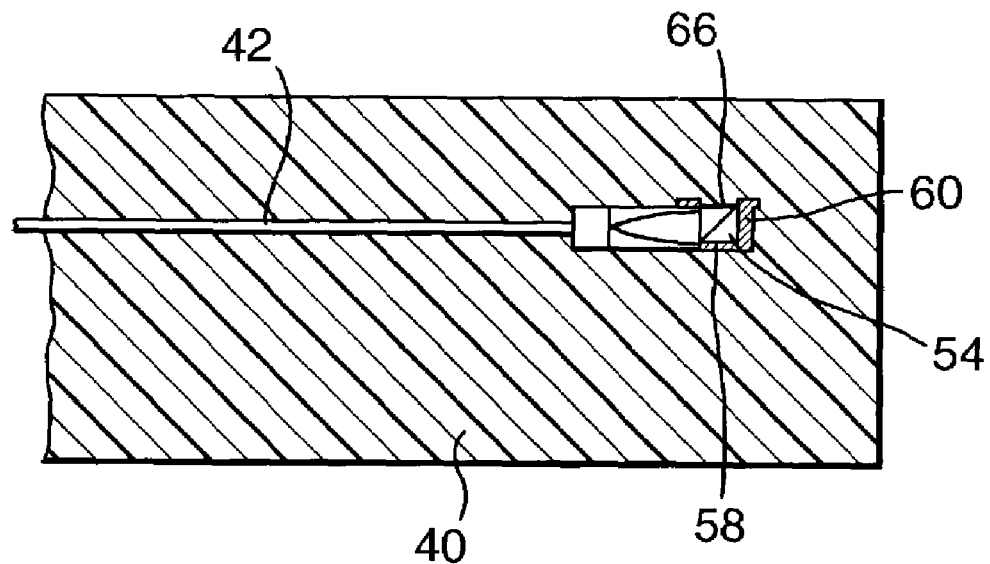
FIG. 3a is a schematic partial sectional view of an aircraft composite incorporating an optical fiber and an embedded optical port according to a fourth embodiment of the present invention.

Referring now to FIG. 3a, a fourth embodiment of the present invention is now described. The fourth embodiment is similar to the third embodiment described above and accordingly only the differences will be described hereinafter. In this embodiment, the composite is manufactured and finished without any pre-formed and plugged passageway to the optical processing element. Rather, the passageway is only formed after manufacture of the composite has been fully completed. More specifically, the composite panel 40 comprises an embedded optical fiber 42, beam collimating micro-optical component 44 and a beam turning mirror 54 as in the third embodiment. However, the turning mirror 54 has specific wavelength selectivity as will be described in detail later. The composite also comprises a machining beam stop 58 provided at an underside of the turning mirror 54 and a metallic position marker 60 which is readily detectable by an imaging technique.

Figure 3B:
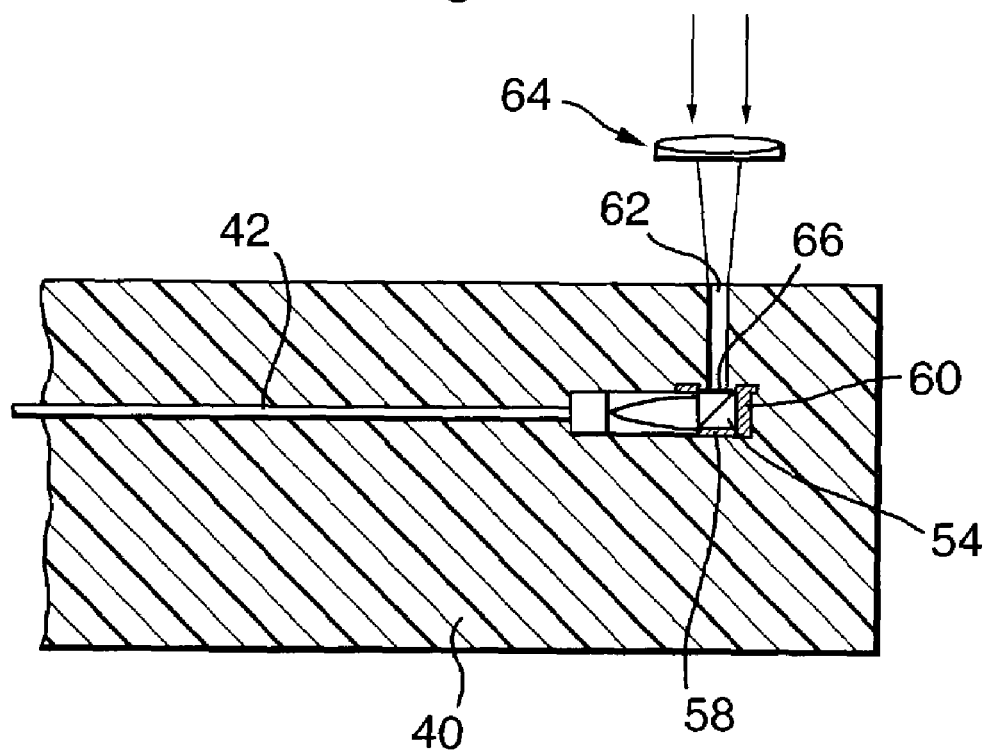
FIG. 3b is a schematic partial sectional view of the aircraft composite of FIG. 3a showing a method of forming a laser machined passageway to the embedded optical port.

Once the composite has been completed, it is X-rayed to determine the precise location of the position marker 60. A drilling point (not shown) is determined and marked on the composite surface. Then a precision laser machining technique as illustrated schematically in FIG. 3b is used to create a passageway 62 from the drilling point through the composite 40 to the position marker 60 and the turning mirror 54. An Excimer laser (for example) together with focusing optics 64 are used as it allows accurate and controlled ablation of composite panel material (e.g., carbon fiber) on a pulse by pulse basis.

This approach requires protection of the embedded optical fiber 42 and micro-optical component 44 to ensure that they are not damaged during the laser machining process. Accordingly, the top surface of the turning mirror 54 is provided with a protective sacrificial coating 66 that can be removed by the Excimer laser after the passageway 62 has been formed. The coating 66 is metallic and aids the machining process because the light reflectivity of the bottom of the passageway 62 is monitored during its formation such that it is possible to determine when this coating 66 had been reached, namely when the passageway is at the correct depth. Then the laser can be set to remove a predetermined thickness of material corresponding to the thickness of the protective coating. Alternatively, the coating can be made of a material such as copper which can be selectively ablated by the laser (due to specific light wavelength absorption characteristics) or selectively chemically etched without damaging the surfaces of the carbon fiber composite 40. In modification to the present embodiment, the position marker (target) 60 can be omitted and the metallic coating 66 can provide its function as it is readily detectable by the X-ray imaging technique.

In the present embodiment, the optical transmission wavelengths and laser machining wavelengths are selected to be different. Also, the turning mirror 54 has a wavelength selective reflectance characteristic to ensure that the machining laser radiation is not coupled into the embedded optical fiber 42. More specifically, the turning mirror 54 has a characteristic which transmits the laser machining wavelengths of light. The absorbing beam stop 58 is positioned so as to absorb the laser radiation once it has created the passageway 62 and has been transmitted through the turning mirror 54.

Once the passageway 62 has been created, the connection to the embedded optical fiber 42 is carried out in a similar manner to that described in the previous embodiments.

A fifth embodiment of the present invention is now described with reference to FIGS. 4a, 4b, 5a, 5b and 5c. In this embodiment, the coupling to an optical fiber 70 is effected to a side portion thereof to form a so called evanescent coupling. The purpose of having evanescent coupling is that it enables a branching structure to be created such that the signal being transmitted along the optical fiber 70 can be split between the existing embedded optical fiber 70 and another optical fiber 72 external to a composite 74 in which the fiber 70 is provided. This form of coupling is used to allow side-access to fiber in an efficient way.

Figure 4A:
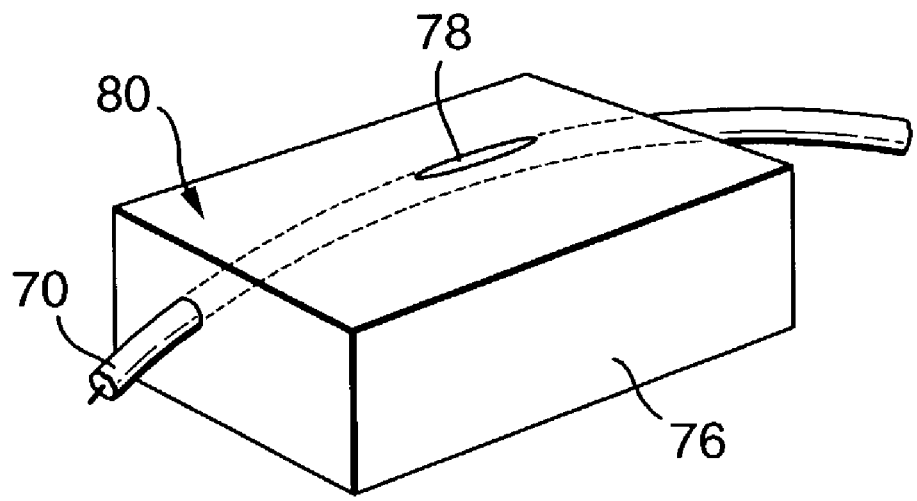
FIG. 4a is a schematic perspective view of an optical fiber in a polishing block which is used to prepare the optical fiber for side coupling in a fifth embodiment of the present invention.
Figure 4B:
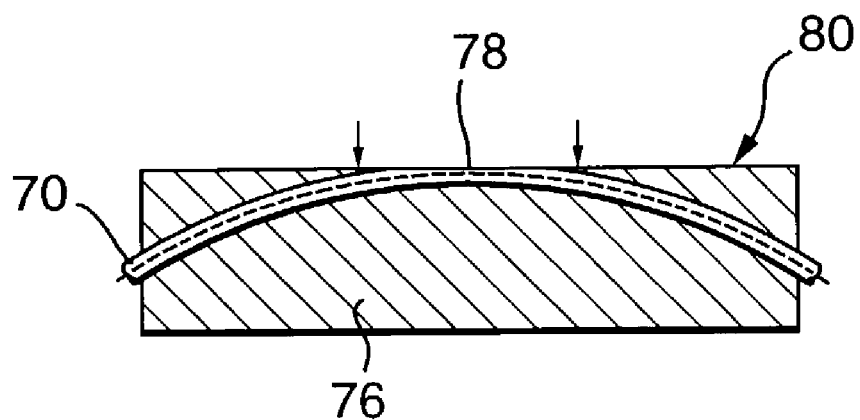
FIG. 4b is a schematic sectional view of the polishing block and optical fiber of FIG. 4a along the length of the polishing block.

FIGS. 4a and 4b show a pre-conditioning procedure employed for creating a side coupling to the optical fiber 70. The procedure involves placing the optical fiber 70 in a polishing block 76 which is arranged to retain the optical fiber 70 with a side portion 78 slightly protruding from a polishing surface 80 of the block 76. The protruding side portion 78 of the optical fiber 70 is then polished using any standard polishing technique which is well known to the skilled addressee. Once the side portion has been polished, the optical fiber 70 is embedded within the composite 74 in such a way as to facilitate coupling to the polished portion 78.

Figure 5A:
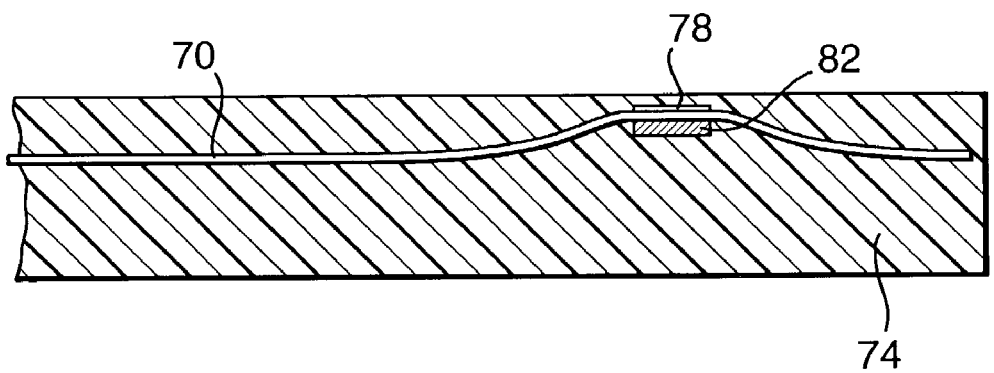
FIGS. 5a, 5b and 5c are schematic partial sectional views of an aircraft composite incorporating the polished optical fiber of FIGS. 4a and 4b showing different stages of a method of interfacing to the embedded optical fiber according to the fifth embodiment of the present invention.

FIG. 5*a*, an embedded evanescent coupler block 82 is provided at the polished side region 78 to provide support for the optical fiber 70 at the predetermined point of connection. The optical fiber 70 and the coupler block 82 are embedded within the composite 74 such that any manufacturing processes acting on the exterior surfaces of the composite do not cause any effect to the optical fiber 70 or the coupler block 82.

Figure 5B:
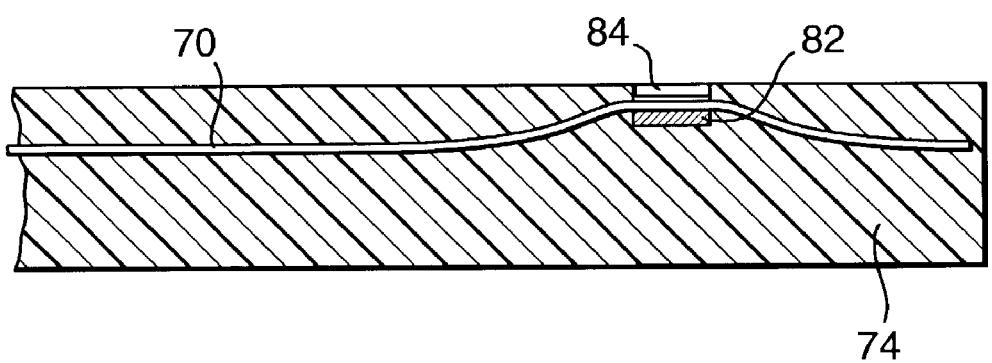
Figure 5C:
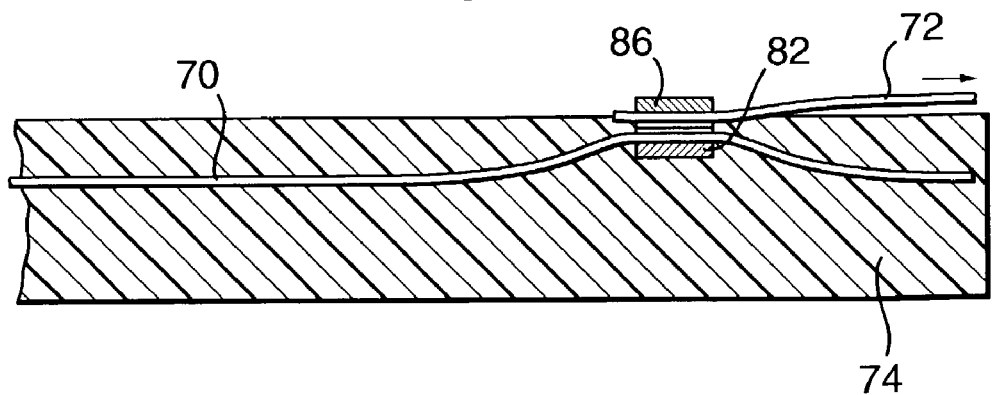

In this embodiment, the coupler block 82 also acts as a post-manufacture position locator for a coupling point and is easily detected by the results of an X-ray scan of the composite 74. Once the scan is completed, a machining point is determined for machining down to the coupler block 82 and the composite 74 is machined to create a shallow passageway 84 for access to the polished side portion 78 of the optical fiber 70 as shown in FIG. 5*b*.

The thus formed passageway 84 is of a size sufficient to house an evanescent interface coupler block 86. The interface coupler block 86 supports an end of the external optical fiber 72 which also has a polished side surface. In order to effect coupling, the interface coupler block 86 and the coupler block 82 are connected together to optically align the respective polished side portions of their optical fiber 70, 72.

In another embodiment (not shown), the optical fibers 70, 72 with polished side portions are replaced by D-fibers in the composite 74. D-fibers are similar to side polished fibers and have a flat side close to the fiber core which gives them a reduced alignment tolerance compared to other optical fiber geometries. At a region of connection, the D-fibers are provided with support blocks for ease of interfacing.

Figure 6A:
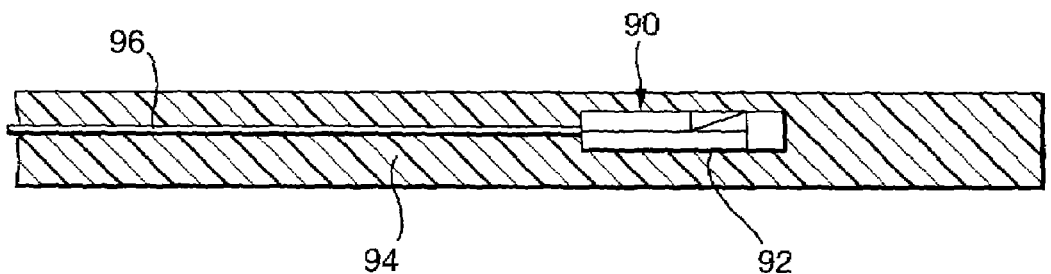
FIG. 6a is a schematic sectional view in a vertical plane of an aircraft composite incorporating an optical fiber and an embedded optical port according to a sixth embodiment of the present invention.
Figure 6B:
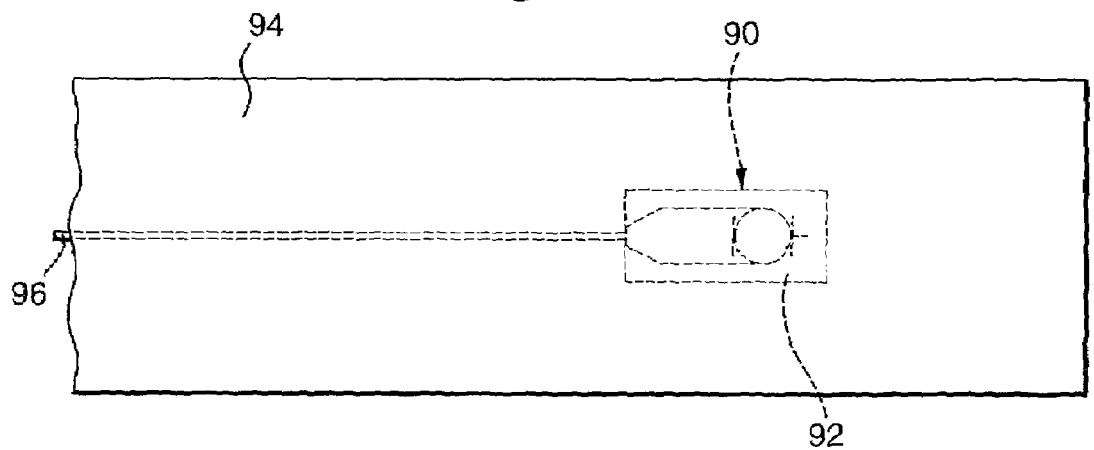
FIG. 6b is a schematic sectional view in a horizontal plane of the aircraft composite of FIG. 6a according to the sixth embodiment of the present invention.

A sixth embodiment of the present invention, as shown in FIGS. 6*a* and 6*b*, is now described. This embodiment is also very similar to the previously described fourth embodiment and, so to avoid unnecessary repetition, only the differences are described hereinafter.

The principle difference is that, for ease of manufacture, the micro-optical component 90 is formed on a micro-substrate 92 that is also embedded within the composite panel 94. The micro-substrate 92 is formed from silicon though alternatively other materials can be used. The machining of silicon is relatively easy and enables connecting structures such as grooves, pockets, reflectors and alignment markers (not shown) to be formed. These connecting structures perform two connectivity functions. Firstly they enable the micro-optical component 90 and the optical fiber 96 to be aligned and secured together with high precision on the micro-substrate 92, and secondly, they enable the combination of the micro-optical component 90 and embedded optical fiber 96 to be coupled to the external connector (not shown) accurately and reliably. The micro-substrate 92 is embedded at the time of composite manufacture.

The micro-optical component 90 can comprise lenses/optics/prisms as well as windows or coatings to protect their optical surfaces prior to being exposed for connection. All of the assembly is embedded during manufacture. It can also include target markers for X-rays/C-scan location of the assembly.

A process that can be used to create alignment structures for the micro-optical components 90 is the so called LIGA (Lithographie Galvanoformung and Abformung) process which is based on X-ray lithography. This process uses deep X-raying of a resist layer and subsequent electroplating to form accurately aligned structures. This can provide alignment structures in metals and ceramics and (from a master structure) allow high-volume replication in other materials such as composites manufactured out of strong plastics materials such as PMMA (Polymethylmethacrylate) and PEEK (Polyetylethylkeytone). The substrate 92 can be formed from various processes, this is but one. Other processes include etching of silicon or laser machining. the aligned substrate 92 and micro-optical components 90 are designed to be rugged enough to survive both the manufacturing process and the operational environment of the aircraft/composite structure.

Some optical processing elements, especially those without rotational symmetry may be susceptible to misalignment during the composite cure process. A substrate containing these elements would minimize such movement. The natural ply structure of the composite material may also make the substrate lie 'flat' further improving alignment to other structures.

Other micro-optical structures that could be used as the beam processing elements in the above embodiments include gratings, wave-guides, evanescent couplers, waveplates, holograms and optical filters. These structures could be involved in system interrogation as well as providing an optical interface.

Having described particular preferred embodiments of the present invention, it is to be appreciated that the embodiments in question are exemplary only and that variations and modifications such as will occur to those possessed of the appropriate knowledge and skills may be made without departure from the spirit and scope of the invention as set forth in the appended claims. For example, whilst X-ray imaging is a preferred way of detecting the location of the embedded optical fiber and/or the micro-optical components, other techniques may also be suitable such as ultrasonic imaging. Also, the use of a substrate can equally well be used to align an optical fiber to an evanescent or D-fiber coupler.

The invention claimed is:

1. A method of coupling a first optical transmission means embedded within a composite to a second optical transmission means external to the composite, the method comprising:

providing an optical processing means for optically processing light to or from the first optical transmission means, said optical processing means being disposed on a discrete micro substrate embedded within the composite;

securing the first optical transmission means to the optical processing means using the micro substrate;

locating the position of the first optical transmission means embedded within the composite;

forming a passageway within the composite to the first optical transmission means; and establishing an optical connection between the first and second optical transmission means at the intersection of the passageway and the first optical transmission means.

2. A method according to claim 1, further comprising providing a high-quality optical interface surface at the intersection of the passageway and the first optical transmission means.

3. A method according to claim 2, wherein the step of forming a passageway comprises drilling or machining through the composite from an exterior surface thereof to the first optical transmission means and severing the first optical transmission means.

4. A method according to claim 3, wherein the step of providing an optical interface surface comprises polishing a severed portion of the first optical transmission means.

5. A method according to claim 1, wherein the step of forming a passageway comprises: drilling or machining through the composite to the first optical transmission means; providing the passageway with a protective plug for closing the passageway; and removing the protective plug prior to the step of forming an optical connection.

6. A method according to claim 1, wherein the step of forming a passageway comprises irradiating an exterior surface of the composite using a laser to access the first optical transmission means.

7. A method according to claim 6, wherein the laser irradiation step comprises using an excimer laser.

8. A method according to claim 6, further comprising preventing light used in the laser irradiation step from being optically coupled with the first optical transmission means.

9. A method according to claim 8, wherein the preventing step comprises differentiating between the wavelengths of the light used in the laser machining step and the light used in the first optical transmission means, and preventing transmission of light used in the laser machining step to the first optical transmission means.

10. A method according to claim 8, wherein the preventing step comprises allowing the light used in the laser machining step to be transmitted to at least one light beam absorbing means provided within the composite.

11. A method according to claim 1, wherein the step of locating the position of the first optical transmission means comprises using an embedded detectable position marker to indicate the location of the first optical transmission means within the composite.

12. A method according to claim 11, wherein the step of forming a passageway comprises using a depth marker to indicate when the passageway has been formed to the correct depth.

13. A method according to claim 12, wherein the depth marker comprises the position marker.

14. A method according to claim 12, wherein one of the position marker and the depth marker comprises a sacrificial coating and the laser irradiation step further comprises removing the coating after formation of the passageway to access the first optical transmission means.

15. A method according to claim 11, wherein the step of locating the position of the first optical transmission means or the step of forming a passageway comprises locating the position of the position marker or the depth marker within the composite using an imaging technique.

16. A method according to claim 15, wherein the imaging technique comprises an X-ray imaging process.

17. A method according to claim 2, wherein the step of establishing an optical connection comprises providing a thermal expanded core optical fibre at the optical interface surface.

18. A method according to claim 1, further comprising aligning an interface means within the passageway to be in optical communication with first optical transmission means at the interface surface, and arranging for the interface means to be accessible to the second optical transmission.

19. A method according to claim 18, wherein the aligning step comprises using an alignment structure embedded within the composite to align the interface means with the first optical transmission means.

20. A method according to claim 19, further comprising forming an alignment structure embedded within the composite using an X-ray lithographic technique.

21. A method according to claim 1, wherein the step of optically processing light comprises steering a light beam.

22. A method according to claim 21, wherein the steering step comprises using a beam splitter or a micro-turning mirror.

23. A method according to claim 1, wherein the step of optically processing light comprises collimating a light beam.

24. A method according to claim 23, wherein the light beam collimating step comprises using a graded index lens or a graded index fiber.

25. An optical coupling for connecting a first optical transmission means embedded within a composite to a second optical transmission means external to the composite, the coupling comprising:
   an optical processing means optically connected to the first optical transmission means for processing light to or from the first optical transmissions means, said optical means being provided on a discrete micro substrate and secured to the first optical transmission means, wherein the micro substrate and optical processing means are embedded within the composite;
   means for locating the position of the first optical transmission means embedded within the composite;
   a passageway formed within the composite to the embedded first optical transmission means; and
   an optical connection established between the first and second optical transmission means at the intersection of the passageway and the first optical transmission means.

26. An optical coupling according to claim 25, further comprising a high-quality optical interface surface provided at the intersection of the passageway and the first optical transmission means.

27. An optical coupling according to claim 26, wherein the passageway comprises a drilled or machined orifice through the composite from an exterior surface thereof to the first optical transmission means to a depth sufficient to sever the first optical transmission means.

28. An optical coupling according to claim 27, wherein the optical interface surface comprises a polished severed portion of the first optical transmission means.

29. An optical coupling according to claim 25, wherein the passageway comprises a drilled or machined orifice through the composite to the first transmission means; and a protective plug provided in the passageway for closing the passageway, the protective plug being removable prior to forming an optical connection.

30. An optical coupling according to claim 25, wherein the passageway comprises a laser irradiated orifice through the composite to the first optical transmission means.

31. An optical coupling according to claim 30, further comprising means for preventing light used in the formation of the laser irradiated orifice from being optically coupled with the first optical transmission means.

32. An optical coupling according to claim 31, wherein the preventing means is arranged to differentiate between the wavelengths of the light used in the formation of the laser irradiated orifice and the light used in the first optical transmission means, and to block transmission of light used in the formation of the laser irradiated orifice to the first optical transmission means.

33. An optical coupling according to claim 31, wherein the preventing means comprises at least one light beam absorbing means embedded at an appropriate position within the composite.

34. An optical coupling according to claim 25, wherein the locating means comprises an embedded detectable position marker to indicate the position of the first optical transmission means within the composite.

35. An optical coupling according to claim 34, further comprising a depth marker embedded within the composite to indicate when the passageway has been formed to the correct depth.

36. An optical coupling according to claim 35, wherein the depth marker comprises the position marker.

37. An optical coupling according to claim 35, wherein one of the position marker and the depth marker comprises a sacrificial coating which is arranged to be removable after the formation of the passageway to access the first optical transmission means.

38. An optical coupling according to claim 37, wherein the coating comprises a reflective coating.

39. An optical coupling according to claim 38, wherein the coating comprises a metallic coating.

40. An optical coupling according to claim 26, wherein the optical interface surface is provided at a thermally expanded core optical fiber connected to the first optical transmission means.

41. An optical coupling according to claim 25, further comprising an interface means alignable within the passageway to be in optical communication with first optical transmission means at the optical interface surface, the interface means being arranged to be accessible to the second optical transmission means.

42. An optical coupling according to claim 41, further comprising an alignment structure embedded within the composite for aligning the interface means with the first optical transmission means.

43. An optical coupling according to claim 25, wherein the optical processing means comprises means for steering a light beam.

44. An optical coupling according to claim 43, wherein the steering means comprises a beam splitter or a microturning mirror.

45. An optical coupling according to claim 25, wherein the optical processing means comprises means for collimating a light beam.

46. An optical coupling according to claim 45, wherein the light beam collimating means comprises a graded index lens or a graded index fiber.

47. An optical coupling according to claim 25, wherein the optical processing means comprises at least one of the group comprising an optical grating element, a wave-guide, a wave plate, a hologram and an optical filter.

48. An optical coupling according to claim 25, wherein the first and/or second optical transmission means comprises an optical fiber.

* * * * *